(12) United States Patent
Mieremet et al.

(10) Patent No.: US 10,053,986 B2
(45) Date of Patent: Aug. 21, 2018

(54) BLADE HAVING A DIVIDED SHAFT AND BLADE UNIT UTILIZING THE BLADE AND METHOD FOR MAKING THE BLADE UNIT

(71) Applicants: Yeoung Cheol Cho, Seoul (KR); THE ARCHIMEDES B.V., Rotterdam (NL); Marinus Mieremet, Vinkeveen (NL); Joon Ho Baek, Daejeon (KR)

(72) Inventors: Marinus Mieremet, Vinkeveen (NL); Joon Ho Baek, Daejeon (KR)

(73) Assignees: Yeoung Cheol Cho (KR); Joon Ho Baek (KR); The Archimedes B.V. (NL); Marinus Mieremet (NL)

( * ) Notice: Subject to any disclaimer, the term of this patent is extended or adjusted under 35 U.S.C. 154(b) by 400 days.

(21) Appl. No.: 14/438,746

(22) PCT Filed: Dec. 11, 2012

(86) PCT No.: PCT/KR2012/010750
§ 371 (c)(1),
(2) Date: Apr. 27, 2015

(87) PCT Pub. No.: WO2014/073741
PCT Pub. Date: May 15, 2014

(65) Prior Publication Data
US 2015/0300177 A1 Oct. 22, 2015

(30) Foreign Application Priority Data

Nov. 6, 2012 (KR) .................. 10-2012-0124715

(51) Int. Cl.
*B23P 15/04* (2006.01)
*F01D 5/14* (2006.01)
(Continued)

(52) U.S. Cl.
CPC .............. *F01D 5/141* (2013.01); *B23K 31/02* (2013.01); *B23P 15/04* (2013.01); *B32B 37/18* (2013.01);
(Continued)

(58) Field of Classification Search
CPC ........ F01D 5/141; F03D 1/0666; F03D 3/061; F03D 3/062; F03D 1/06; F03D 80/00; F03D 13/20; B23P 15/04
See application file for complete search history.

(56) References Cited

U.S. PATENT DOCUMENTS 4,930,987 A * 6/1990 Stahl ....................... B63H 1/20
416/219 A
5,577,321 A * 11/1996 Brown .................... B23P 15/00
29/527.6

FOREIGN PATENT DOCUMENTS

EP          0965753      12/1999
KR          10-1037474   5/2011
(Continued)

*Primary Examiner* — Logan Kraft
*Assistant Examiner* — Danielle M Christensen
(74) *Attorney, Agent, or Firm* — Roberts Mlotkowski Safran Cole & Calderon, P.C.

(57) ABSTRACT

A method for making blade unit with divided shaft facilitating drastically the productivity and assembling compared to a method fixing blade to a shaft using many connecting parts. The method for making blade unit includes steps for making a blade with divided shaft comprising a blade and a divided shaft that is attached integrally to a root portion of the blade and divided into a plurality of portions in a direction of length of the shaft, and combining a plurality of made blades with divided shaft together with one another through the divided shaft.

15 Claims, 8 Drawing Sheets

(51) Int. Cl.
*F03D 1/06* (2006.01)
*F03D 3/06* (2006.01)
*B23K 31/02* (2006.01)
*B32B 37/18* (2006.01)

(52) U.S. Cl.
CPC .............. *F03D 1/06* (2013.01); *F03D 1/0666* (2013.01); *F03D 3/061* (2013.01); *F03D 3/062* (2013.01); *B32B 2603/00* (2013.01); *F05B 2250/25* (2013.01); *Y02E 10/721* (2013.01); *Y02E 10/74* (2013.01); *Y02P 70/523* (2015.11)

(56) References Cited

FOREIGN PATENT DOCUMENTS

| | | |
|---|---|---|
| KR | 10-2012-0091462 | 8/2012 |
| WO | 2011/142653 | 11/2011 |
| WO | 2012-009482 | 1/2012 |

\* cited by examiner

[Fig. 1]
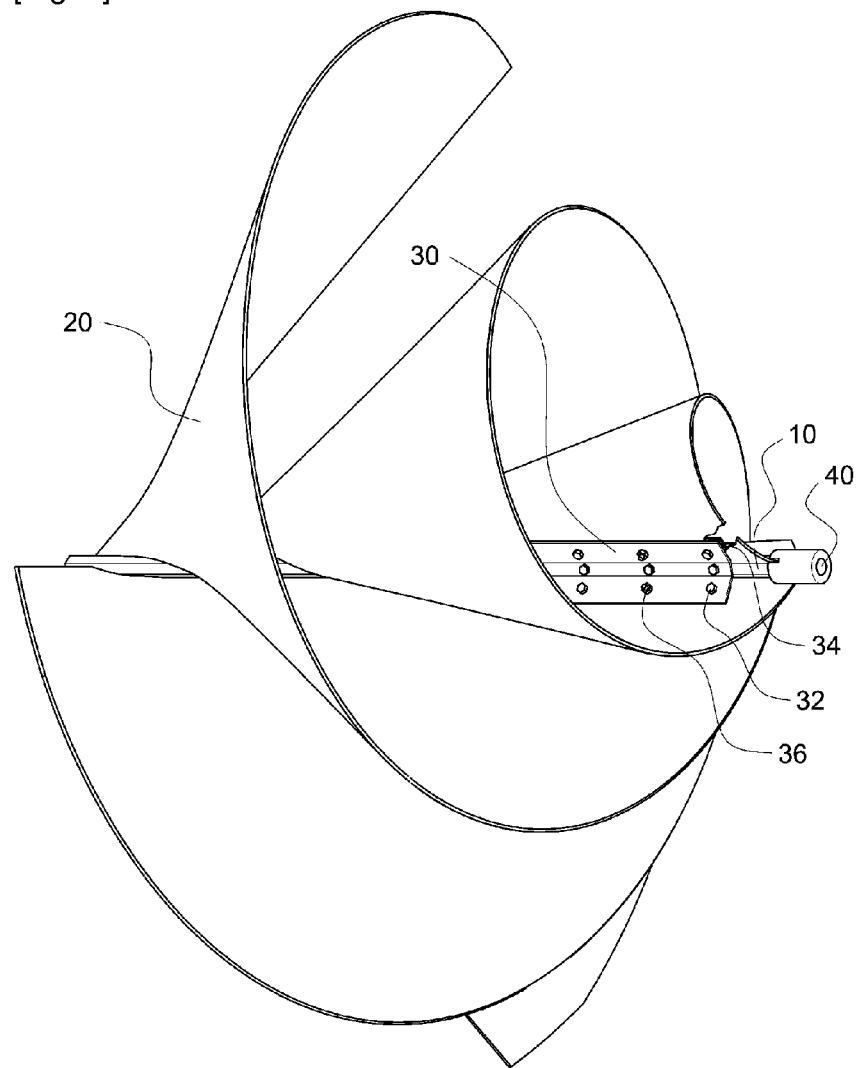

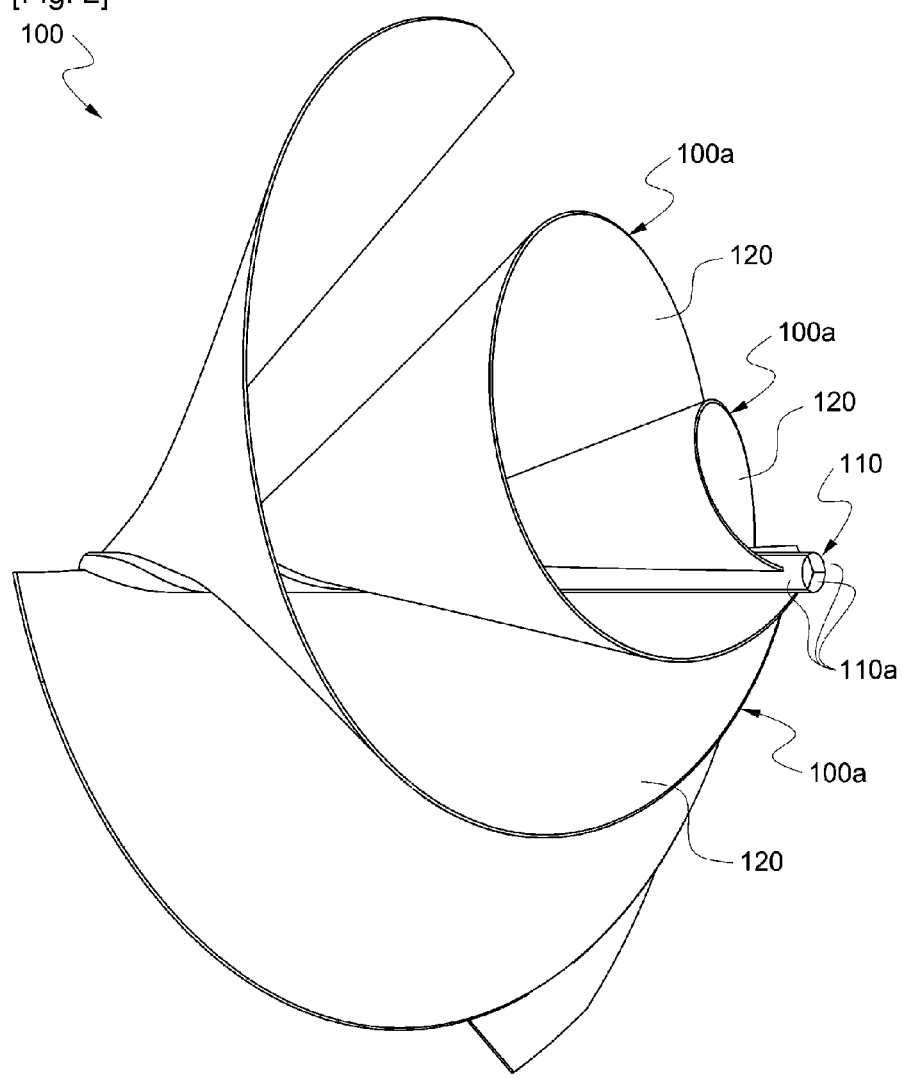

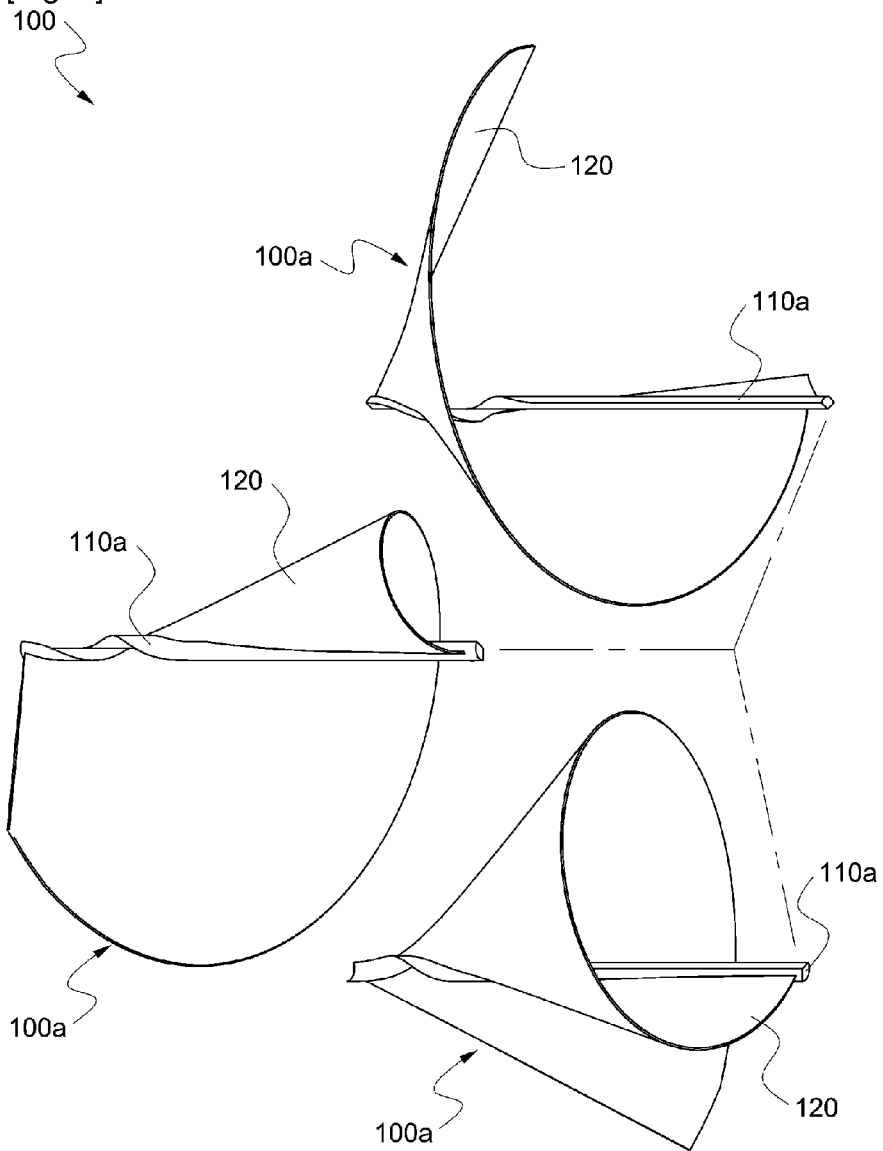

[Fig. 4]
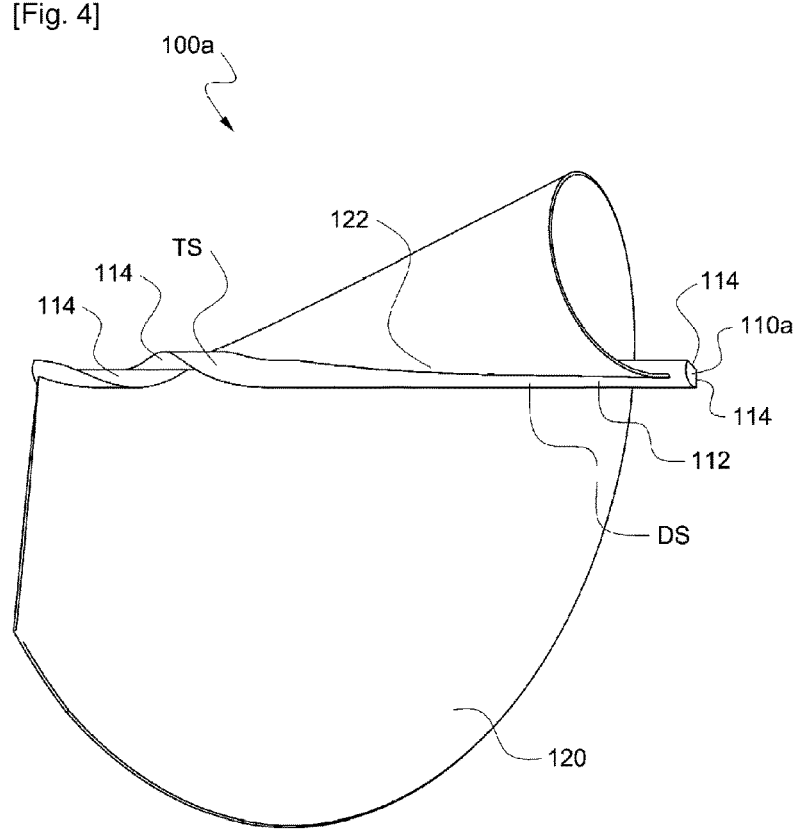
[Fig. 5]
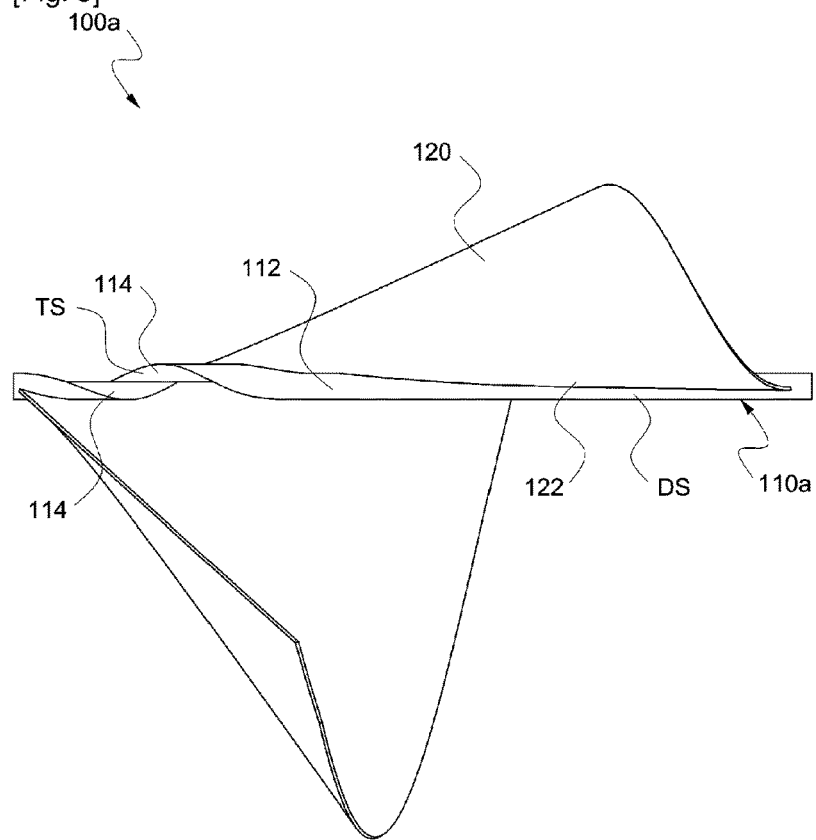

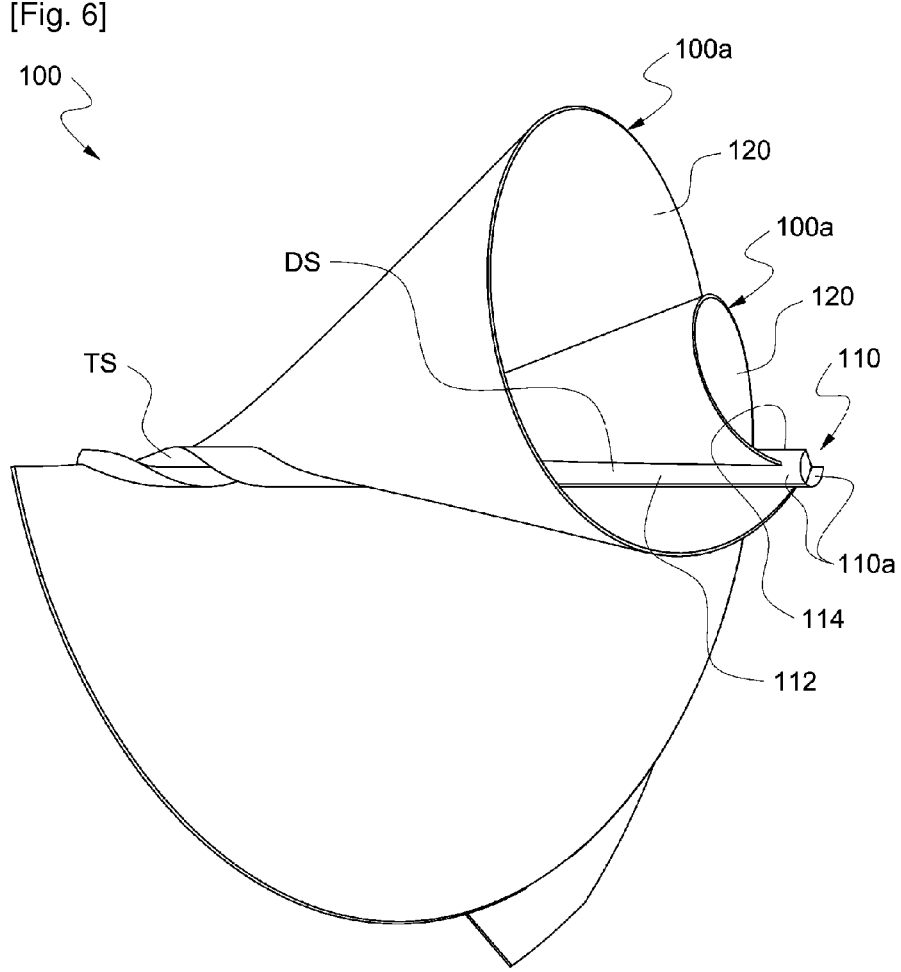

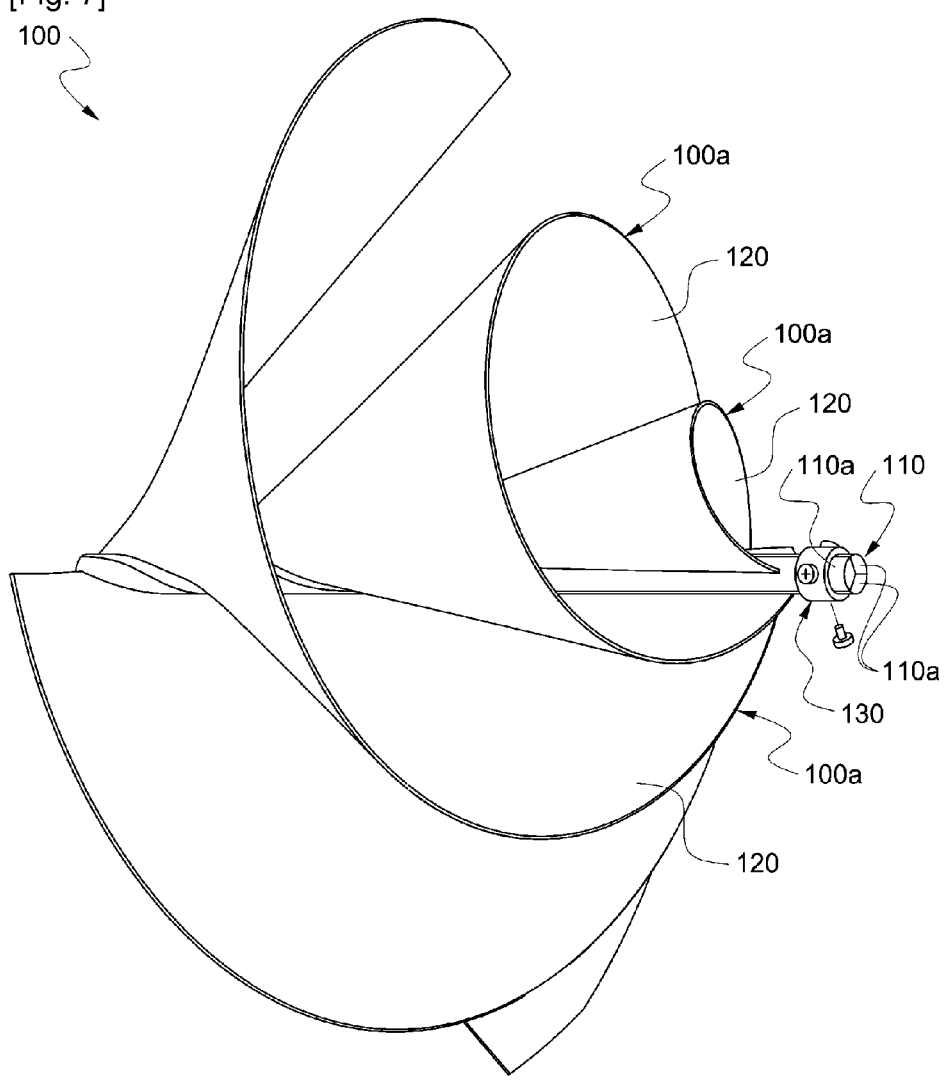
[Fig. 7]

[Fig. 8]
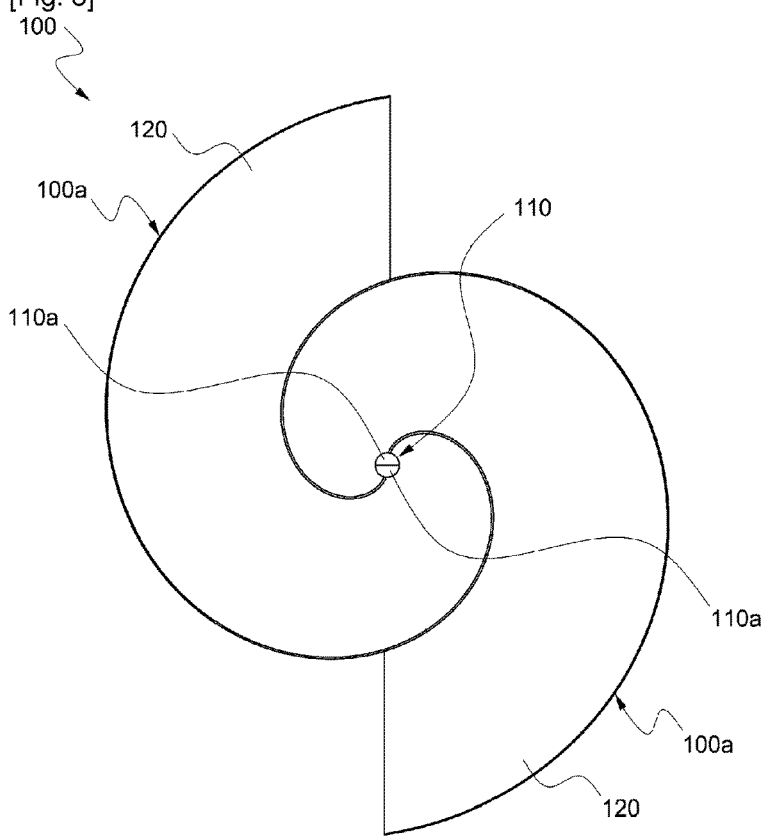
[Fig. 9]
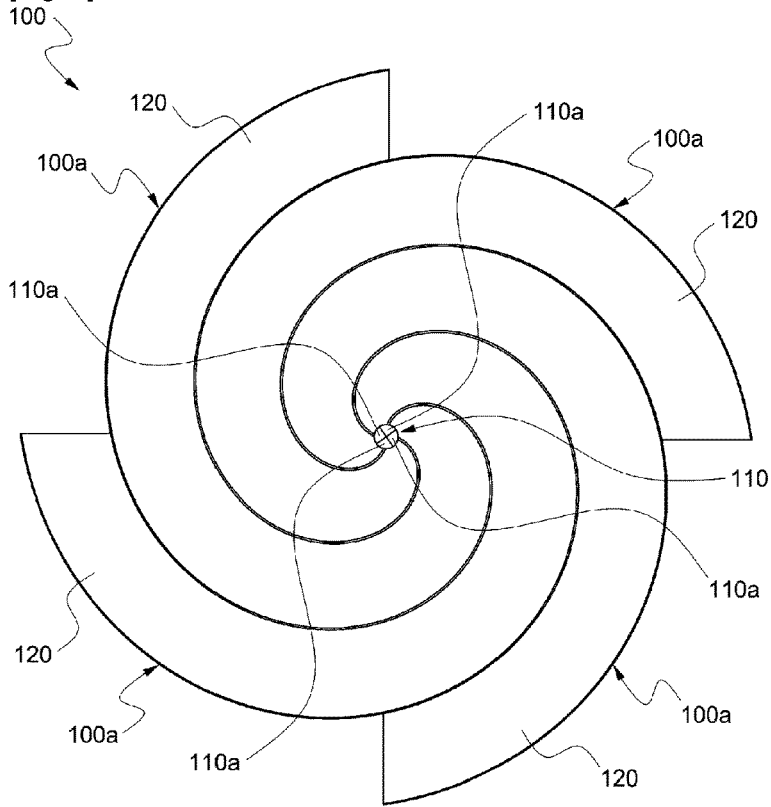

[Fig. 10]

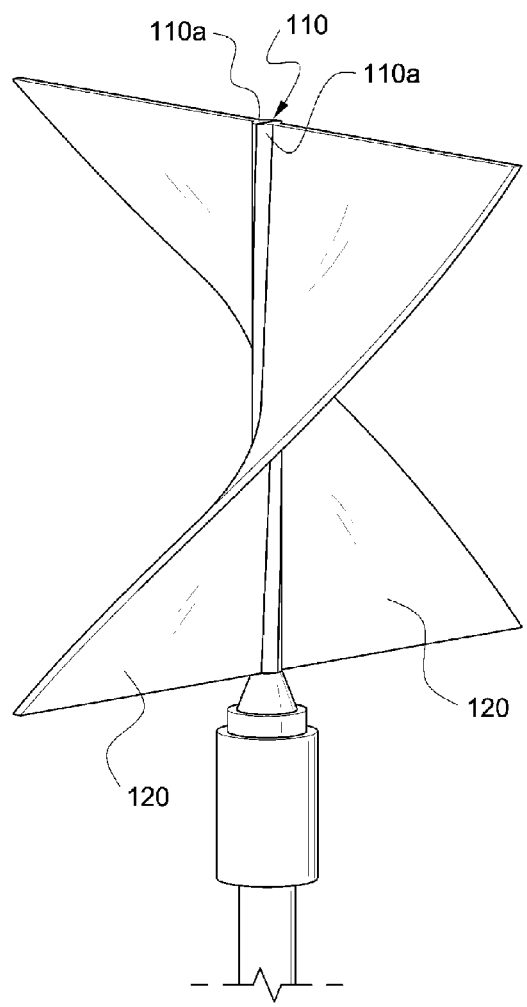

[Fig. 11]

```
┌─────────────────────────────────────┐
│   Make blade with divided shaft that │── S1
│   the divided shaft is attached to the blade │
└─────────────────────────────────────┘
                  ↓
┌─────────────────────────────────────┐
│   Apply adhesive to joining sub-surface │── S2
│          of each divided shaft         │
└─────────────────────────────────────┘
                  ↓
┌─────────────────────────────────────┐
│  Joining blades with divided shaft through │── S3
│    the divided shaft applied with adhesive │
└─────────────────────────────────────┘
                  ↓
┌─────────────────────────────────────┐
│ Strengthen joining force among the divided shafts │── S4
│ (install a ring body at an end portion of the shaft, etc.) │
└─────────────────────────────────────┘
```

BLADE HAVING A DIVIDED SHAFT AND BLADE UNIT UTILIZING THE BLADE AND METHOD FOR MAKING THE BLADE UNIT

TECHNICAL FIELD

The present invention relates to a blade, more specifically to a blade used for obtaining rotational force from flowing fluid, wind, water etc. and a blade unit using the blade and a method for making the blade unit. The present invention is a technology on a blade unit suitable especially for a wind power generation.

BACKGROUND ART

Various types of wind power generators using wind have been known. Prior arts related to the individual blade mentioned by the invention were disclosed in detail in WO 2011/142653 A1 ("previously filed invention" from now on). The disclosed technology related to the individual blade disclosed in the above international publication is here incorporated by reference by citing the international publication as a prior art to the present invention.

In general, a wind power generator comprises a shaft and a blade unit engaged to the shaft and disposed around the shaft for obtaining torque from wind.

DISCLOSURE OF INVENTION

Technical Problem

Due to the complicated shape and the disposing structure of the blades attached to the circumferential surface of the shaft, it is almost impossible to make the blade unit integrally. Also, most blade units for power generation are difficult to make the whole integrally because the size is large.

Therefore, the blade is made separately from the shaft and then attached to the shaft through bolts, etc., in which various kinds of parts such as many bolts, etc., tools, and materials are needed and it takes long to assemble. Especially, in the individual spiral blade made in shapes described in FIGS. 1 through 3 of the previously filed invention, since the inner side must be attached strongly to the shaft along the long length of the shaft, it is a big deal to make the blade unit. This holds true for the other types of blades in which the blade must be attached to the shaft along the long length thereof.

FIG. 1 is a partially cross-sectional perspective view of a blade unit for wind power generation for explaining an exemplary method created by the inventors in the course of completing the present invention for trying to attach 3 spiral blades around the shaft.

In FIG. 1 is shown a shaft 10. On the circumferential surface of the shaft 10 are installed three frames 30 with even angular intervals for attaching blades 20 strongly. In order to attach the frame 30 to the circumferential surface of the shaft 10 while surface-contacting, the shaft 10 has a hexagonal cross-section. Each frame 30 has a bent shape with bilateral symmetry, and is attached to the shaft 10 through a plurality of bolts 32. The blade-inserting portions 34 are formed with an interval in which the inner side of the blade 20 can be inserted between two neighboring frames 30. The blade-inserting portions 34 are disposed at three locations radially and with equal angular intervals about the shaft 10 as a center. In each blade-inserting portion 34 is inserted the inner side of the corresponding spiral blade 20.

In this state, the inner side of the blade 20 is attached to the frame 30 through the frame 30 forming the blade-inserting portion 34, a plurality of bolts 32 penetrating the inner side of the blade 20, and nuts 36 engaged to the bolts 32. At an end of the shaft 10 is installed a fixing device 40 for holding an end of the blade 20 while engaging to the circumferential surface of the shaft 10. On a surface of the fixing device 40 corresponding to the blade 20 must be formed a groove for inserting the end of the shaft 10.

The method of attaching the blade 20 to the shaft 10 as shown in FIG. 1 has many shortcomings as follows.

First, many parts such as blade-assembling frame 30, many bolts 32 and nuts 36 for attaching the frame 30 to the circumferential surface of the shaft 10, the fixing device 40 for fixing the end of the blade 20, etc. are needed.

Second, many grooves or holes for bolt-assembling to the shaft 10, the frame 30, and the inner side of the blade 20 must be formed.

Third, it takes a long time in the processes of attaching the frame 30 to the circumferential surface of the shaft 10 and attaching the blade 20 to the frame 30.

Fourth, a large number of bolts 32 and nuts 36 protrude and hinder free flow of wind, decreasing the energy conversion efficiency.

Fifth, the long time spent in making causes the increase of the unit price of the item.

Sixth, due to the protruding bolts 32 and nuts 36 it is hard to obtain a beautiful appearance, which reduces the quality of the item.

Seventh, it is heavy because of the bolts 32, the nuts 36, the frame 30, the fixing device 40, etc. that are made of metal.

Eighth, since the cross-section of the shaft 10 should be machined to be polygonal such as hexagonal, it takes longer to machining the shaft 10 compared to the case using a shaft with circular cross-section.

An object of the invention is to provide a blade unit that does not have the above shortcomings, especially a blade unit that can be used for wind power generation.

Another object of the invention is to provide a blade having a divided shaft that is used for making a blade unit according to the invention.

Still another object of the invention is to provide a method for making a blade unit according to the invention effectively.

Still another object of the invention is to provide a method for making a blade unit easily, in which the root portion of the blade should be connected to the circumferential surface of the shaft along a long length.

Solution to Problem

According to the invention, a blade having a divided shaft, for making a blade unit including a shaft and a plurality of blades engaging the shaft and disposed around the shaft for obtaining torque from a flow of fluid, comprises a blade; and a divided shaft connected integrally along a root portion of the blade and having a shape of dividing the shaft into a plurality of portions in a direction of length of the shaft.

Preferably, the divided shaft provides a circumferential sub-surface forming a part of the circumferential surface of the shaft and a joining sub-surface for joining with a divided shaft of the other blade having a divided shaft, and wherein the root portion extends in the direction of length of the divided shaft and connected to the divided shaft along the circumferential sub-surface.

The blade may be a spiral blade or a twist-type blade.

Preferably, the circumferential sub-surface and the joining sub-surface of the divided blade comprise a linear surface portion disposed linearly in the direction of length of the shaft and a twisted surface portion twisted in a spiral direction around the circumference of the shaft.

The divided shaft has a shape of dividing the shaft into three portions in the direction of length of the shaft.

A surface of the divided blade may comprise a linear surface portion disposed linearly in the direction of length of the shaft and a twisted surface portion twisted in a spiral direction around the circumference of the shaft.

According to the invention, a blade unit comprises a shaft and a plurality of blades connected to the shaft, engaging the shaft, and disposed around the shaft for obtaining torque from a flow of fluid, and a plurality of blades with divided shaft are joined together with one another through a divided shaft, and each of the blade with divided shaft comprises a blade and the divided shaft that is attached integrally to a root portion of the blade and has a shape of dividing the shaft into a plurality of portions in a direction of length of the shaft.

Each of the divided shafts may provide a circumferential sub-surface forming a part of the circumferential surface of the shaft and a joining sub-surface joined with a divided shaft of a neighboring blade having a divided shaft, and the root portion extends in the direction of length of the divided shaft and is connected to the divided shaft along the circumferential sub-surface.

In such a case, preferably the blade is a spiral blade or a twist-type blade, the circumferential sub-surface and the joining sub-surface of the divided shaft comprise a linear surface portion disposed linearly in the direction of length of the shaft and a twisted surface portion twisted in a spiral direction around the circumference of the shaft, and the divided shaft has a shape of dividing the shaft into three portions in the direction of length of the shaft.

Preferably, the plurality of blade with divided shaft may have a same shape.

For the blade, irrespective of spiral blade, twist-type blade, or other type of blade, preferably the divided shaft has a shape of dividing the shaft into three portions in the direction of length of the shaft, and the shaft is formed by combining three blades with divided shaft.

According to the invention, a method, for making a blade unit including a shaft and a plurality of blades engaging the shaft and disposed around the shaft for obtaining torque from a flow of fluid, comprises steps for: making a blade with divided shaft comprising a blade and a divided shaft that is attached integrally to a root portion of the blade and has a shape of dividing the shaft into a plurality of portions in a direction of length of the shaft; and combining a plurality of made blades with divided shaft together with one another through the divided shaft.

Preferably, in the step for making a blade with divided shaft, a surface of the divided blade is formed so as to comprise a linear surface portion disposed linearly in the direction of length of the shaft and a twisted surface portion twisted in a spiral direction around the circumference of the shaft.

In the step for combining a plurality of made blades, the plurality of blades with divided shaft that have a same shape may be combined with one another.

Preferably, in the step for making a blade with divided shaft, the blade with divided shaft is formed by FRP molding method.

The FRP molding method may be selected from the group consisting a Hand Lay Up method, a Spray Up method, a Lining method, an injection method using a closed-type mold, a press molding method using FRP powder, Sheet Molding Compound (S.M.C.) method, and Bulk Molding Compound (B.M.C.) method.

In the step for making a blade with divided shaft, the blade with divided shaft may be formed by a casting method using regular plastic, engineering plastic, or metal, or a press method or a sheet metal forming using aluminum, stainless steel (STS) and the like.

The step for combining a plurality of made blades with divided shaft may be performed by more than one out of a method of combining the divided shafts using glue or FRP material according to a material of the divided shaft, a method of combining the divided shafts using welding or melting (fusion welding), a method of combining the divided shafts using bolts, and a method of combining the divided shafts using ring members enclosing the circumferential surface of an end portion of the shaft.

The invention such as the above may be realized without bolts and nuts, but sometimes, for a structural stability, a few bolts or a device for tying and holding the divided shafts into one may be used additionally.

In cases, the divided shafts may be combined through bolts.

A blade unit according to the invention uses preferably three blades for a balance in rotation. However, sometimes two, four, or five blades may be used. This holds true for the spiral blades illustrated in the figures of embodiments below, and they are allowable if they have a shape of dividing the shaft with the same angle with respect to the plurality of blades about the shaft as a center.

The shape of the spiral blade is same as one which was mentioned as the rotor blade (referred as "prototype blade" below) in the previously filed invention. However, of course, variations varied a little and similarly from the prototype blade of the previously filed invention can be applied to the present invention.

The rotor blade, the prototype blade, of the previously filed invention is configured to have a spiral shape enclosing the rotational central shaft, to extend effectively from the central shaft along the central shaft, and to be able to be defined within a flat plane and to be converted to a three-dimensional spiral shape.

Also, the rotor blade in the previously filed invention can be defined substantially in a circle by a curve in the circle extending from a center of circle to substantially a circumference of the circle, a straight line extending radially from a center of circle to substantially the cross point of the curve and the circumference of the circle and by that the circle is divided into a rotor blade region and a deleting region. The area ratio of the rotor blade region to the deleting region is about 2:1. The curve in the circle may be straightened straight to become a straight line, and the straight line becomes a rotational center or central shaft of the prototype blade.

If the blade is a spiral blade, preferably in the invention, in order to make the virtual portion corresponding to the rotational center of the prototype blade aligned to the rotational center of the shaft, a blade with a root portion of the prototype blade removed by a radius of the shaft is used. Then the blades with divided shaft can be assembled and combined easily together without interference between the blades with divided shaft.

In the above invention, even though the shape of the prototype blade of spiral blade is basically same, the prototype blade with various sizes according to the generating power capacity or application can be used. In such cases, there is no further relationship between the length of the shaft and the radius of the shaft other than that if the length of the shaft is increased, and the diameter of the shaft must be increased so as to withstand the increased force on the blades due to the increase of the volume of the blade unit.

In the embodiment of the spiral blade unit of the invention, the length of the shaft is related to the volume of the blade unit. For example, in an embodiment of the invention, compared to a case that the length of a portion of the shaft connected with the blade is 110 cm, if the length is 55 cm the volume of the blade unit is reduced to ⅛ in a whole (length ½×width ½×height ½).

In the invention, if the blade unit is made in various sizes with a same shape, the shape of the divided shaft would be same irrespective of the diameter of the shaft. Irrespective of the diameter of the shaft, the twisted surface portion of the divided shaft would be formed in a spiral shape of the root portion of the blade.

In the invention, if one wants to increase or decrease the diameter of the shaft with respect to a blade with a same size, preferably since the shape of the root portion of the blade touching the shaft or the starting position of the twisting must be changed and the divided shaft must be made in a corresponding shape according to the diameter of the shaft, the shape of the divided shaft changes according to the diameter of the shaft that one wants to use.

For example, in an embodiment, the removed portion of the root portion of the blade which kept approximately straight until the diameter of the shaft is about 8 mm gets large as the diameter of the shaft gets bigger with respect to the blade of the same size. Thus the portion twisted from the rear side of the blade gets bigger and bigger, and when the diameter of the shaft becomes 30 mm the entire root portion of the blade turns into a spiral shape.

In the present invention, the reason for forming the twisted surface in the divided shaft may be because it is good to make to fit to the root portion of the blade in which a part that is close to the root portion in the prototype blade is removed.

Of course, if a blade same as the prototype blade with a straight root portion is used, the surface of the divided shaft should be made in a linearly disposed shape. However, in such a case, since the root portion of the prototype blade is not disposed at the rotational center of the shaft, it gets very difficult to assemble the blades with divided shaft due to interfering of them.

The diameter of the shaft in the blade unit of the invention is preferable to be same across the entire length, but it is also possible to use a divided shaft the diameter of which increases more or less according to position in a direction of the length of the shaft.

Advantageous Effects of Invention

Simplification of manufacturing processes and quality improvement are the best merits of the invention. The invention enables to make the blades with divided shaft in which the divided shaft and the blade are attached integrally in a same shape and to make a blade unit by assembling 2-5 of them together through the divided shaft, such that the invention is superior to a method of attaching blades to a shaft using many connecting parts in productivity and assembly.

Also, since they can be laminated, the blades with divided shaft according to the invention take less space in storing and transporting, and since they are easy to assemble it is possible to apply to a DIY item.

The advantages of the invention can be enumerated as follows.

According to the invention, a blade unit for wind power generation can be provided without using separate frame, bolts, nuts, and tools for engaging them.

Using the invention, even though bolts etc. are used, the number of them can be minimized.

According to the invention, since a blade unit for wind power generation can be made just by bonding the blades with divided shaft through the divided shaft, the making procedure is very simple and easy, shortening the time for making.

Especially, since the divided shafts forming the shaft in the invention have portion to engage one another through a twisted surface portion, the engaging among the divided shafts is maintained strongly.

Also, since the divided shaft of the blade unit for wind power generation according to the invention has a liner surface portion and a twisted surface portion, the assembling is easy and the engaging among the divided shafts is maintained strongly.

Using the invention, since it is possible to remove or minimize protruding bolts and the like, the wind flow is not hindered and the appearance can be maintained beautiful.

Since a blade and a divided shaft of a blade unit for wind power generation according to the invention are made integrally, the connecting portion between the shaft and the blade is strong and its structural stability is excellent.

Since it does not have to use bolts, frame, etc. which are heavy, a blade unit for wind power generation according to the invention is of light weight and can obtain torque even from a weak wind.

According to the invention, many grooves and holes for assembling bolts do not have to be formed on the frame and inner side of the blades.

Also, according to the invention, since the plurality of blades with divided shaft for forming a blade unit used for wind power generation have the same shape, the number of molds used in making thereof can be reduced.

Since a blade with divided shaft according to the invention has one blade, a mass production method using molds such as injection molding, casting, etc. can be used to produce even in the case of spiral blade.

Also, according to the invention, since all the blades with divided shaft have the same shape, when any one of the blades with divided shaft is broken, it can be easily replaced with another one with a very high interchangeability.

BRIEF DESCRIPTION OF DRAWINGS

FIG. 1 is a partially cross-sectional perspective view of a blade unit for wind power generation for explaining an exemplary method for trying to attach 3 spiral blades around the shaft, FIG. 2 is a perspective view of a blade unit for wind power generation according to the invention, FIG. 3 is an exploded perspective view of the blade unit for wind power generation of FIG. 2, FIG. 4 is a perspective view of a blade with divided shaft according to the invention, which is used to make a blade unit for wind power generation, FIG. 5 is a left side view of the blade with divided shaft of FIG. 4, FIG. 6 is a perspective view showing a state attaching two blades with divided shaft of FIG. 4 together through a divided shaft, FIG. 7 is a diagram showing a state of installing a ring for increasing engaging force among the divided shafts, FIG. 8 is a front view of a blade unit for wind power generation made using two blades with divided shaft, FIG. 9 is a front view of a blade unit for wind power generation made using four blades with divided shaft, FIG. 10 is a perspective view showing another embodiment of a blade unit according to the invention, and FIG. 11 is a flowchart showing a manufacturing process of a blade unit for wind power generation according to the invention.

REFERENCE NUMERALS

100: blade unit 100a: blade with divided shaft
110: shaft 110a: divided shaft
112: circumferential sub-surface 114: joining sub-surface
120: blade 122: root portion

BEST MODE FOR CARRYING OUT THE INVENTION

Below, referring to the figures, preferable embodiments of the invention are going to be described in detail.

FIG. 2 is a perspective view of a blade unit for wind power generation according to the invention, FIG. 3 is an exploded perspective view of the blade unit for wind power generation of FIG. 2, FIG. 4 is a perspective view of a blade with divided shaft according to the invention, which is used to make a blade unit for wind power generation, FIG. 5 is a left side view of the blade with divided shaft of FIG. 4, and FIG. 6 is a perspective view showing a state attaching two blades with divided shaft of FIG. 4 together through a divided shaft.

As shown in FIGS. 2 and 3, a blade unit for wind power generation 100 of the embodiment according to the invention comprises a shaft 110 at the center and three blades 120 attached to the circumferential surface of the shaft 110. These blades 120 are disposed around the shaft 110 with even angular intervals.

A blade unit for wind power generation 100 shown in FIG. 2 is made using three of blade with divided shaft 100a according to the invention shown in FIGS. 3-5. Preferably, the three blades with divided shafts 100a have the same shape.

Thus it is possible to reduce the number of molds in manufacturing the blade unit for wind power generation 100 according to the invention, and a damaged blade with divided shaft 100a can be replaced easily with another one.

Referring to FIGS. 2-6, the divided shaft 110a is attached along the root portion 122 of the blade 120. Preferably, the blade with divided shaft 100a is configured to be made integrally with the divided shaft 110a and the blade 120. This is one of the major features of the invention. And it is another one of the major features of the invention to make a blade unit for wind power generation 100 by combining a plurality of such blade with divided shafts 100a through the divided shaft 110a.

The divided shaft 110a has a shape that the shaft 110 is divided into a plurality of portions in a direction of length of the shaft 110. In this embodiment, the divided shaft 110a has a shape that the shaft 110 is divided into three portions in the direction of length of the shaft 110. Thus the divided shaft 110a takes a cross-sectional shape of dividing a circle of cross-section of the shaft 110 into three portions with intervals of 120 degrees circumferentially about the center of the circle. The divided shaft 110a in such an embodiment comprises a circumferential sub-surface 112 forming a circumferential surface of the shaft of the blade unit for wind power generation 100 and two joining sub-surfaces 114 each of which joins with other divided shaft 110a. In this embodiment, a preferable angle between the two joining sub-surfaces 114 is 120 degrees. Of course, if the thickness of gluing medium between the divided shafts 110a gets larger, the angle between the two joining sub-surfaces 114 may be smaller than 120 degrees.

Preferably, such circumferential sub-surface 112 and two joining sub-surfaces 114 comprise a linear surface portion DS disposed linearly along a direction of length of the shaft 110 and a twisted surface portion TS twisted in a spiral direction around the circumference of the shaft. The linear surface portion DS helps assembling among the divided shafts 110a, and the twisted surface portion TS helps the divided shafts 110a to maintain the strong combining state even under twisting moment by the rotation of the blade 120. That the divided shaft 110a includes both of a portion forming the linear surface portion DS and a portion forming the twisted surface portion TS is one of the major features of the invention. However, the linear surface portion DS and the twisted surface portion TS do not have to be formed together in the divided shaft 110a, and in cases the entire divided shaft 110a may be formed with the linear surface portion or the twisted surface portion only. In this embodiment, about ⅔ of the length of the divided shaft 110a is formed as the linear surface portion DS and the remaining ⅓ is formed as the twisted surface portion TS. The overall twisting angle of the twisted surface portion TS and the root portion 122 of the blade 120 is about 360 degrees.

The root portion 122 of the blade 120 connected to the linear surface portion DS is preferably a straight line, and the root portion 122 of the blade 120 connected to the twisted surface portion TS is twisted as much as the twisted surface portion TS. And the angle of the blade 120 with respect to the shaft 110 gets larger and larger toward the twisted surface portion TS. The extent of angle change of the blade 120 with respect to the shaft 110 may be adjusted.

Referring to FIGS. 4 and 5, the joining sub-surface 114 in the twisted surface portion TS is formed in two lines.

Also in a case that the shaft 110 is formed with the divided shaft 110a divided into four portions in a direction of length of the shaft 110, preferably the joining sub-surface 114 comprises two of them. In this case, the cross-section of the divided shaft 110a may be of a shape of about one quarter of a circle.

In a case that the shaft 110 is formed with the divided shaft 110a divided into two portions in a direction of length of the shaft 110, preferably the joining sub-surface 114 comprises only one of it. In this case, the cross-section of the divided shaft 110a may be of a shape of half circle.

The blade 120 is extending in a direction of length of the divided shaft 110a, connected to the divided shaft 110a, and has a shape of a helix enclosing the divided shaft 110a. Such a spiral blade 120 is formed as connected integrally along the circumferential sub-surface 112 of the divided shaft 110a forming the circumferential surface of the shaft 110.

Forming the divided shaft 110a and the blade 120 as connected integrally may be formed by FRP preferably, and in cases a casting molding method using regular plastic, engineering plastic, or metal or something like that may be used.

The above three blade with divided shafts 100a may be joined by adhesives through the divided shaft 110a.

A state that only two blade with divided shafts 100a are joined to each other through the joining sub-surface 114 of the divided shaft 110a can be seen in FIG. 6. In FIG. 6 the two divided shafts 110a are joined to each other through one joining sub-surface 114 of each, and the other joining sub-surface 114 of each is exposed to outside so as to join with the two joining sub-surfaces 114 of the remaining divided shaft 110a.

MODE FOR THE INVENTION

FIG. 7 is a diagram showing a state of installing a ring for increasing engaging force among the divided shafts.

In cases, in order to supplement the joining force among the divided shafts 110a by adhesives, as shown in FIG. 7, a ring body 130 may be installed in an end portion of the shaft 110. Or in certain cases, even though not illustrated, the joining among the divided shafts 110a may be strengthened by joining the divided shafts 110a by bolts, etc. at a few locations. The ring body 130 may be installed on both end portions or any one end portion of the shaft 110.

FIG. 8 is a front view of a blade unit for wind power generation made using two blades with divided shaft.

In cases, a blade unit for wind power generation 100 according to the invention can be made by making a divided shaft 110a in a shape dividing the shaft 110 into two, making a blade with divided shaft 100a by forming a blade 120 integrally there, and joining two blade with divided shafts 100a made as such to each other through the divided shaft 110a.

The rest is same as explained through FIGS. 2-7.

FIG. 9 is a front view of a blade unit for wind power generation made using four blades with divided shaft.

In cases, a blade unit for wind power generation 100 according to the invention can be made by making a divided shaft 110a in a shape dividing the shaft 110 into four, making a blade with divided shaft 100a by forming a blade 120 integrally there, and joining four blade with divided shafts 100a made as such to one another through the divided shaft 110a.

The rest is same as explained through FIGS. 2-7.

Referring to the previous embodiments, it may be seen that a unit for wind power generation according to the invention can be made by joining five blades with divided shaft. Of course, it is possible with six of them, but the efficiency of making would be decreased.

The blade unit 100 using spiral blades described in the above corresponds to a horizontal-type blade unit, and the shaft 110 is installed substantially horizontally when installed in a wind power generator. Each blade 120 of the blade unit 100 using spiral blades has an angle with respect to the shaft 110 gets larger and larger as going rearward, the length of the blade 120 also gets larger and larger radially.

FIG. 10 is a perspective view showing another embodiment of a blade unit according to the invention.

The blade unit 100 shown in FIG. 10 corresponds to a vertical-type blade unit, and the blade 120 is of twisted-type, which is called a Savonius-type. The inventive features of the invention can be applied to the Savonius-type blade unit as they are.

The blade shown in FIG. 10 has a constant degree of twisting and the radial length along the entire length of the shaft 110. In this embodiment, a surface of each divided shaft 110a has a twisted shape by a constant angle along the length.

FIG. 11 is a flowchart showing a manufacturing process of a blade unit for wind power generation according to the invention. Referring further to FIGS. 2-10, the making process of a blade unit for wind power generation according to the invention is described.

First, blade with divided shafts 100a in which the divided shaft 110a is attached to the blade 120 integrally is made. For making of such blade with divided shafts 100a, it is preferable to use the FRP. In the FRP molding method for making structures of a desired shape using the FRP are known a Hand Lay Up method, a Spray Up method, a Lining method, an injection method using a closed-type mold, a press molding method using FRP powder, Sheet Molding Compound (S.M.C.) method, Bulk Molding Compound (B.M.C.) method, etc.

For reinforcing material used in the FRP molding method are used mainly glass fiber and carbon fiber. The mechanical strength property of the FRP using glass fiber depends on composition of glass fiber, and disposition and arranging direction of glass fiber, etc. In a case of using carbon fiber, high strength and high elasticity can be obtained, which cannot be obtained with the glass fiber. Besides, something like aramid fiber (trademark kevlar) may be also used as reinforcing material.

In cases, instead of the FRP, using a casting molding method using regular plastic, engineering plastic, or metal, the blade with divided shaft 100a according to the invention can be made.

In case of using the above method, the divided shaft 110a is formed as connected integrally to the root portion 122 of the blade 120.

In case of metal material, a method in which the blade 120 is made by press method or plate molding method and then joined to the divided shaft 110a may be used.

Also, in certain cases, a method in which a blade 120 and a divided shaft 110a with a blade-joining groove of a shape of the root portion 122 of the blade 120 for joining the blade 120 on a circumferential surface are made separately and then joining the blade 120 to the divided shaft 110a using adhesives or other means while the root portion 122 of the blade 120 is inserted into the blade-joining groove can be used S1.

Next, apply an adhesive to a joining sub-surface 124 of the divided shaft 110a of each blade with divided shaft 100a S2. When the blade with divided shaft 100a is metal, this step may be skipped.

And then, join the blade with divided shafts 100a to one another through the divided shaft 110a applied with the adhesive S3. In this step the divided shafts 110a have the joining sub-surface 114 of the linear surface portion DS assembled and joined with the joining sub-surface 114 of the linear surface portion DS, and the joining sub-surface 114 of the twisted surface portion TS with the joining sub-surface 114 of the twisted surface portion TS. In cases, without using the adhesive, the divided shafts 110a can be joined through fusion welding by heating the joining sub-surface 114 of the divided shaft 110a.

Also, in cases, when the blade with divided shaft 100a is made of metal, the divided shafts 110a can be joined through welding or fusion welding while assembled without the adhesive.

After finishing joining among the divided shafts 110a, a work for strengthening the joining force among the divided shafts 110a may be performed S4. For example, as described in FIG. 7, one can have a ring body 130 joined to both end portions of the shaft 110 and enclose an end portion of the shaft 110. In a case that the blade unit for wind power generation 100 is small, the divided shafts 110a can be joined to one another just by installing the ring body 130 on both end portions of the shaft 110.

INDUSTRIAL APPLICABILITY

The present invention can be utilized in a water power generation using flow of water as well as in the wind power generation using wind. Besides, the present invention may be used as an energy conversion device for obtaining torque from flow of fluid.

The invention claimed is:

1. A blade having a divided shaft, for making a blade unit including a shaft and a plurality of blades engaging the shaft and disposed around the shaft for obtaining torque from a flow of fluid, comprising:
a blade; and
a divided shaft of the shaft connected integrally along a root portion of the blade and having a shape of dividing the shaft into a plurality of portions in a direction of length of the shaft,
wherein the divided shaft provides a circumferential sub-surface forming a part of the circumferential surface of the shaft and a joining sub-surface for joining with a divided shaft of another blade having a divided shaft of the blade unit, and wherein the root portion extends in the direction of length of the divided shaft and connected to the divided shaft along the circumferential sub-surface,
wherein the circumferential sub-surface and the joining sub-surface of the divided shaft comprise a linear surface portion disposed linearly in the direction of length of the shaft and a twisted surface portion twisted in a spiral direction around the circumference of the shaft, and
wherein the root portion of the blade connected to the linear surface portion is formed to have the shape of a straight line, the root portion of the blade connected to the twisted surface portion is twisted as much as the twisted surface portion and the angle of the blade with respect to the shaft gets larger and larger toward the twisted surface portion from the linear surface portion.

2. The blade having a divided shaft of claim 1, wherein the blade is a spiral blade or a twist-type blade.

3. The blade having a divided shaft of claim 2, wherein the linear surface portion is longer than the twisted surface portion.

4. The blade having a divided shaft of claim 3, wherein the divided shaft has a shape of dividing the shaft into three portions in the direction of length of the shaft.

5. A blade unit comprising
a plurality of blades having divided shafts of claim 1 are joined together with one another through the divided shafts.

6. The blade unit of claim 5, wherein each blade of the plurality of blades having divided shafts is a spiral blade or a twist-type blade.

7. The blade unit of claim 5, wherein the divided shafts have a shape of dividing a shaft of the blade unit into three portions in the direction of length of the shaft.

8. The blade unit of claim 5, wherein the plurality of blades having divided shafts have a same shape.

9. The blade unit of claim 5, wherein the divided shafts have a shape of dividing a shaft of the blade unit into three portions in the direction of length of the shaft, and the shaft is formed by combining three blades having divided shafts.

10. A method for making a blade unit comprising steps for:
making a plurality of blades having divided shafts of claim 1; and
combining the plurality of blades having divided shafts together with one another through the divided shafts.

11. The method of claim 10, wherein, in the step for combining the plurality of blades having divided shafts, the plurality of blades having divided shafts that have a same shape are combined with one another.

12. The method of claim 10, wherein, in the step for making the plurality of blades having divided shafts, the plurality of blades having divided shafts are formed by a fiber reinforced plastic (FRP) molding method.

13. The method of claim 12, wherein the fiber reinforced plastic (FRP) molding method is selected from the group consisting a Hand Lay Up method, a Spray Up method, a Lining method, an injection method using a closed-type mold, a press molding method using fiber reinforced plastic (FRP) powder, Sheet Molding Compound (S.M.C.) method, and Bulk Molding Compound (B.M.C.) method.

14. The method of claim 10, wherein, in the step for making the plurality of blades having divided shafts, the plurality of blades having divided shafts are formed by a casting method using plastic, engineering plastic, or metal, or a press method or a sheet metal forming using aluminum, stainless steel (STS).

15. The method of claim 10,
wherein the step for combining the plurality of made blades having divided shafts is performed by more than one out of a method of combining the divided shafts using glue or fiber reinforced plastic (FRP) material according to a material of the divided shaft,
a method of combining the divided shafts using welding or melting,
a method of combining the divided shafts using bolts, and
a method of combining the divided shafts using ring members enclosing the circumferential surface of an end portion of the shaft.

* * * * *